(12) United States Patent
Muhlestein et al.

(10) Patent No.: US 7,676,815 B2
(45) Date of Patent: *Mar. 9, 2010

(54) SYSTEM AND RELATED METHODS FOR ACCESSING MANAGEMENT FUNCTIONALITY THROUGH A COMMAND LINE UTILITY

(75) Inventors: Travis J. Muhlestein, Redmond, WA (US); Jeffrey P. Snover, Woodinville, WA (US); John P. Thompson, Seattle, WA (US); Arieh A. Retik, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/777,011

(22) Filed: Jul. 12, 2007

(65) Prior Publication Data

US 2008/0016501 A1    Jan. 17, 2008

Related U.S. Application Data

(63) Continuation of application No. 09/896,207, filed on Jun. 28, 2001, now Pat. No. 7,278,143.

(51) Int. Cl.
  *G06F 3/00* (2006.01)
  *G06F 7/00* (2006.01)
  *G06F 17/00* (2006.01)
(52) U.S. Cl. .................. 719/328; 707/1; 715/200

(58) Field of Classification Search ........... 719/310, 719/328; 707/102, 100, 1; 715/200
See application file for complete search history.

(56) References Cited

U.S. PATENT DOCUMENTS

| | | | |
|---|---|---|---|
| 5,450,600 A | | 9/1995 | Abe |
| 5,499,371 A | * | 3/1996 | Henninger et al. ......... 717/108 |
| 5,500,929 A | * | 3/1996 | Dickinson ................. 715/853 |
| 5,560,005 A | * | 9/1996 | Hoover et al. .............. 707/10 |
| 6,058,391 A | | 5/2000 | Gardner |

(Continued)

OTHER PUBLICATIONS

Scumpu, "Session 3: CIM Diagnostic Development Guidelines and Demo", 2000. (The corresponding document was previously submitted in connection with U.S. Appl. 10/646,473 and is not being resubmitted herewith per 37 CFR 1.98(d).).

(Continued)

*Primary Examiner*—Lechi Truong

(57) ABSTRACT

A command line utility is described that overlays the management infrastructure of an enterprise to provide easier command options for administrators to effectively manage the enterprise. The primary intent of the command line utility is to facilitate management of the environment without requiring administrators to write scripts or navigate a vast schematized enterprise exposed through the management infrastructure. The command line utility provides command options through class aliases that enable the mapping of management queries and operations to a common term or friendly name that can be extended both in an alias file or at run time in the command line.

16 Claims, 10 Drawing Sheets

U.S. PATENT DOCUMENTS

| | | | | |
|---|---|---|---|---|
| 6,473,426 B1* | 10/2002 | Killian | ........................ | 370/393 |
| 6,560,591 B1 | 5/2003 | Memmott et al. | | |
| 6,598,169 B1 | 7/2003 | Warwick et al. | | |
| 6,629,128 B1* | 9/2003 | Glass | ......................... | 709/203 |
| 6,775,661 B1* | 8/2004 | Redner | ........................... | 707/3 |
| 6,889,249 B2* | 5/2005 | Miloushev et al. | ........... | 709/213 |
| 6,983,186 B2* | 1/2006 | Navani et al. | ................. | 700/95 |
| 6,990,629 B1* | 1/2006 | Heaney et al. | ............... | 715/200 |
| 7,206,824 B2* | 4/2007 | Somashekar et al. | ......... | 709/220 |
| 2002/0019886 A1* | 2/2002 | Sanghvi et al. | ............. | 709/318 |

OTHER PUBLICATIONS

UT, "Using the Command Line Utility", 2000. (The corresponding document was previously submitted in connection with U.S. Appl. 10/646,473 and is not being resubmitted herewith per 37 CFR 1.98(d).).

Steinke, "Network and System Management with XML", Oct. 1, 1999. (The corresponding document was previously submitted in connection with U.S. Appl. No. 10/646,473 and is not being resubmitted herewith per 37 CFR 1.98(d).).

\* cited by examiner

```
Set SystemSet =
GetObject("winmgmts:{impersonationLevel=impersonate}!//MY_PC").Instance
sOf ("Win32_OperatingSystem")

for each System in SystemSet
    WScript.Echo "NETBIOS Name: "& System.CSName
    'WScript.Echo "System.BuildType
    WScript.Echo "Service Pack: " & System.CSDVersion
    WScript.Echo "Last Booted: " & System.LastBootUpTime
    WScript.Echo "Manufacturer: " & System.Manufacturer
    WScript.Echo "O/S Version: " & System.Version
    WScript.Echo System.Name
    iEqual = InStr(1,System.Name, "Workstation",1)
    If (iEqual <> 0) Then
    MsgBox ("Workstation")
    Else
    MsgBox ("Not a Workstation")
    End if
next Set SystemSet = Nothing Set ComputerSet =
GetObject("winmgmts:{impersonationLevel=impersonate}!//MY_PC").Instance
sOf ("Win32_Share")

for each Object in ComputerSet
    WScript.Echo "Share: "& Object.Name
next

Set ComputerSet = Nothing

Set ServiceSet =
GetObject("winmgmts:{impersonationLevel=impersonate}!//MY_PC").Instance
sOf("Win32_ComputerSystemProduct")

For each Object in ServiceSet
        'Msgbox system.Caption
        'Msgbox system.Description
    '   msgbox system.IdentifyingNumber
        'msgbox "Product: " & Object.Name
        msgbox "Manufacturer: " & Object.Name 'msgbox "Build: " & Object.BuildNumber
next Set ServiceSet = Nothing
```

Fig. 1

SYSTEM AND RELATED METHODS FOR ACCESSING MANAGEMENT FUNCTIONALITY THROUGH A COMMAND LINE UTILITY

CROSS-REFERENCE TO RELATED APPLICATION

This application is a continuation of and claims priority to U.S. Pat. No. 7,278,143 application Ser. No. 09/896,207, filed on Jun. 28, 2001, the disclosure of which is incorporated herein by reference.

COPYRIGHT NOTICE/PERMISSION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention generally relates to the management of systems and devices in an enterprise environment, and, more particularly, to a system and methods for accessing management functionality through a command line utility driven by persistent data represented using an object-oriented structure.

BACKGROUND

As computer systems and networks continue to increase in size and complexity, so too does the challenge of managing them. A significant tool that assists network developers and administrators in managing computers across an enterprise is Windows® Management Instrumentation (WMI). WMI enables the remote management of Windows-based systems and applications by exposing management information through an object-oriented structure defined using WMI schemas. WMI schemas are an implementation of the Common Information Model (CIM) as defined by the Desktop Management Task Force (DMTF).

The CIM is an industry standard method for describing management information that relies on inheritance and other object-oriented features for the reuse and standardization of object classes representing system devices. Expressing management information through standardized object classes permits companies to develop hardware, software, and systems that can all be managed in the same way. Thus, a single management application can manage all the diverse components in an enterprise environment.

A CIM schema, made up of a well-defined collection of class definitions, was developed which many companies have agreed to follow. This schema contains a top-level set of classes applicable to all management domains. The CIM schema makes significant use of inheritance to allow management applications to treat groups of similar objects in the same way. Companies can create extension schemas that are made up of classes representing managed objects that are technology-specific additions to the CIM schema. This involves exposing management functionality through classes derived from the CIM schema. These classes typically apply to specific environments such as UNIX or the Microsoft® Windows operating system. A particular implementation of the industry standard CIM for the Windows operating system is WMI.

WMI supports the management of systems and devices by exposing management information across an enterprise, such as hardware settings, performance information, driver configurations, BIOS information, application settings, event log information, and so on, and by providing a mechanism to query for information and configure settings on machines across the enterprise. WMI provides access to management information on a single network machine, or a large number of machines all at once. For example, without WMI, an administrator wanting to enumerate descriptions for various groups of objects on a machine must locate and learn different application programming interfaces (APIs) that describe the specific methods for communicating with each group of objects. However, WMI eliminates the need to learn the specifics of every API set provided by Windows, through gathering information from a diverse set of APIs and presenting this information in a simple, industry-standard management object model.

Therefore, many comprehensive and well-documented managed resources are available to those developers and administrators capable of utilizing the benefits of WMI. However, WMI is generally designed for use by developers or administrators who are at least moderately proficient at programming in C/C++, Microsoft Visual Basic®, and scripts. For example, an administrator using WMI who wants to remotely discover system properties, such as the Last Boot Time, the NetBIOS Name, and the Service Pack Level, might write a script such as that shown in FIG. 1. The script of FIG. 1 uses WMI to walk through the 'Win32_OperatingSystem' object, allowing the discovery of these properties. Writing the script illustrated in FIG. 1, however, may be beyond the ability of many administrators, and the discovery of basic system information may therefore be difficult without the assistance of a more experienced programmer. In addition, much of the power of WMI is realized through developers writing management applications that monitor configure and control the management information made available through WMI. Therefore, the benefits of WMI are often difficult to attain for the common administrator who does not have the proper programming background, but who still has a need to manage system components/objects.

In addition to needing some level of programming ability, WMI users should be generally familiar with object-oriented modeling. Understanding object-oriented modeling is important to understanding how various objects within the CIM schema, and any extension schema, relate to each other. However, even with a fair grasp of the concepts of object-oriented modeling, the extension schema that WMI exposes for Windows-based systems and applications is so large (having some 600 to 700 classes and 3000 to 4000 properties), that a non-specialist typically has difficulty understanding the schema in its raw form.

Many administrators have the need to accomplish specific tasks, such as configuring a network card or recovering a database. Having to navigate an extensive schema to locate a particular object and invoke a particular method to accomplish such a task can be difficult. The amount of information exposed by WMI is simply too unwieldy to permit many administrators to efficiently manage the network. This is another reason that the benefits of WMI are often difficult to attain for many administrators.

Accordingly, there exists a need to assist system developers and administrators in utilizing the wide variety of management features and vast amounts of management information that WMI provides.

SUMMARY

This invention concerns a command line utility that overlays Microsoft's Windows Management Instrumentation (WMI) technology to provide easier command options for administrators to effectively manage a system or enterprise. The primary intent of the WMI command line utility is to facilitate management of a Windows environment without requiring administrators to write scripts or navigate the vast schematized enterprise exposed through WMI. The WMI command Line utility provides command options through class aliases that enable the mapping of queries, WMI operations, and other system inquiries to a common term or friendly name that can be extended both in an alias file or at run time in the command line.

The WMI command line utility facilitates the management of an enterprise based on the underlying representative schema that WMI intrinsically exposes. The WMI schema represents the enterprise as an object-oriented model that follows the industry standard CIM schema and includes Windows-based extensions to the CIM schema. In addition to operating against the object model WMI schema, the WMI command line utility is itself driven by an object model schema. A set of commands for the WMI command line utility is configured by an underlying object model command schema that defines a mapping between the commands and the WMI schema. Generally, each command (i.e., class alias within the command schema) defines a target object within the WMI schema against which the command will operate. The command schema that drives the commands is tailorable and extensible based on the specific administrative requirements of a given enterprise. Therefore, where typical command line applications are rigidly defined by an underlying source code that users cannot access, thus requiring a program rewrite in order to add or alter commands, the WMI command line utility is flexibly defined by the user-accessible, object-oriented command schema that is both tailorable and extensible to meet specific administrative demands of an organization and keep up with a changing target WMI schema.

In a typical embodiment, the WMI command line utility is implemented on a management station with operations being performed through the utility against one or more target systems, that are assumed to include the basic WMI infrastructure. Therefore, the command line utility is a process on the management station, and the command schema (together with its class aliases or populated class instances) that drives the utility only needs to exist on the management station. The command schema will not have to be present on the target stations in order for the utility to function.

The command schema typically exists in a default namespace structure on the management station. A namespace is a logical, rather than physical, grouping of classes and class instances, and the default namespace is intended to reflect the organization of a company's operational environment. Therefore, the namespace structure can be expected to vary substantially from one organization to another.

In addition to providing a default namespace in which the command schema is located, the WMI command line utility enables administrators to organize class instances into role-oriented namespaces in such a way that the command aliases required by a specific administrative role will be found together. The namespaces provide paths to alias definitions that represent commands that are relevant to specific administrative roles. This enables administrators to focus on a specific set of commands relevant to their desired tasks, without having to navigate the entire command schema to locate desired command aliases. Therefore, in addition to being tailorable and extensible, the command schema can be organized in a manner which facilitates ease of use of the WMI command line utility.

BRIEF DESCRIPTION OF THE DRAWINGS

The same reference numbers are used throughout the drawings to reference like components and features.

FIG. 1 illustrates a typical script written to discover system properties in a WMI environment.

DETAILED DESCRIPTION

Exemplary Environment for Implementing a WMI Command Line Utility

Figure 2:
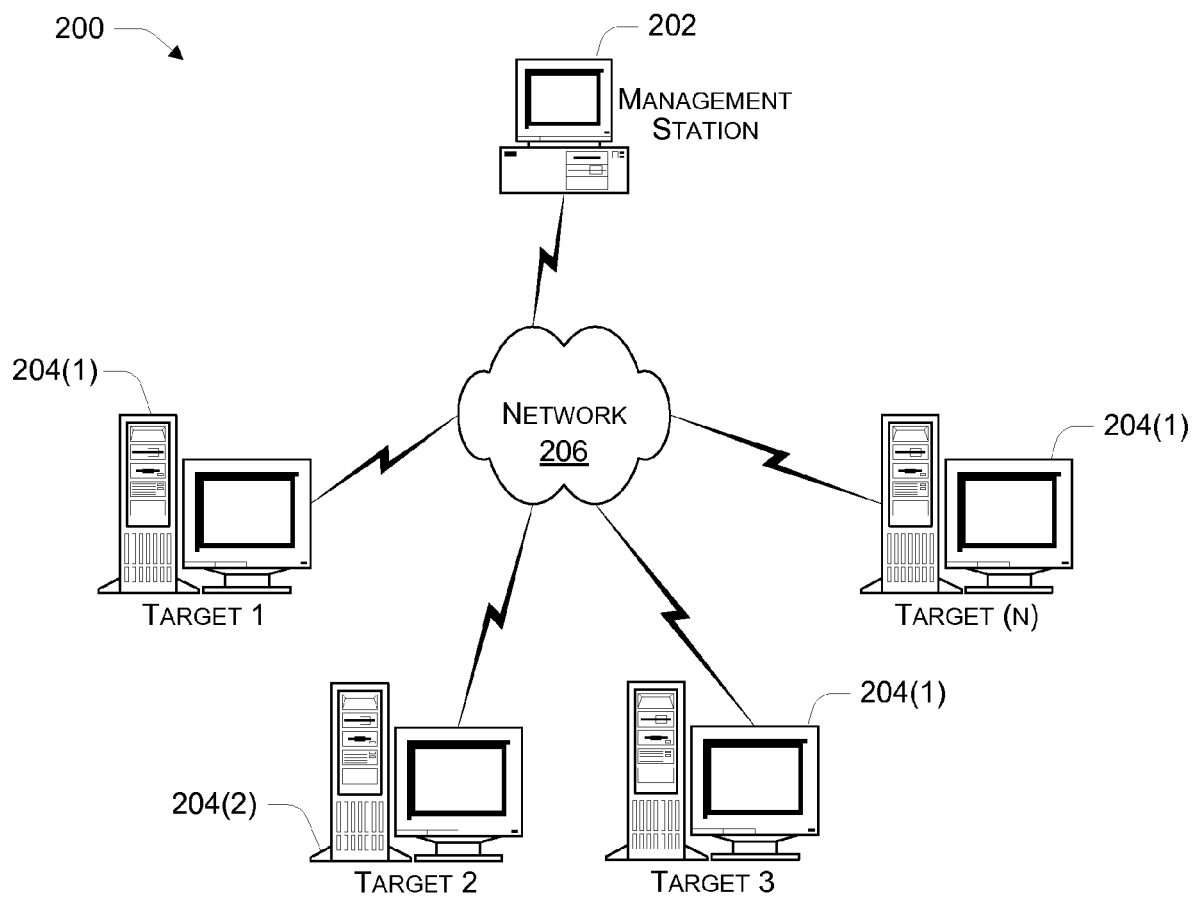
FIG. 2 illustrates an exemplary system environment for providing access to WMI functionality through implementation of a WMI command line utility.

FIG. 2 illustrates an exemplary system environment 200 for providing access to management functionality through implementation of a command line utility. A particular embodiment of environment 200 provides access to WMI functionality through the implementation of a WMI command line. In a typical system embodiment 200, an administrator at a management station 202 manages systems on one or more target stations 204 in an enterprise over a network 206. The command line utility is not limited to implementation in a particular network environment, but can be implemented through various networks 206 including the Internet, an intranet, a wide area network (WAN), a local area network (LAN), or any other communication link. In addition, the command line utility can operate locally, with the systems on the management station 202 itself as its target. In such a limited scenario, the network 206 is unnecessary altogether.

Moreover, although the command line utility is typically accessed at a local management station 202 as illustrated in the exemplary system 200 of FIG. 2, it is also remotely accessible through the network 206 using different connection options such as a telnet connection, a terminal services connection, a remote procedure call (RPC) connection, or some other secured connection type. Once a connection is made to the command line utility on the management station 202, connections to other target stations 204 can be made through the utility itself In the exemplary system 200 of FIG. 2, a particular embodiment of the target stations 204 executes Windows-based operating systems and presents a WMI infrastructure. The command line utility ordinarily executes on the management station 202, performing operations against the one or more target stations 204. In general, the utility executes on the management station 202 to extend the WMI infrastructure, enabling WMI functionality at the command line. Thus, the utility provides a command line interface to WMI, exposing the WMI schema, WMI naming, and WMI queries.

Although the command line utility executes on the management station 202 in the exemplary system 200 of FIG. 2, it is not limited to operation on such a management station 202. The utility can operate on any Windows-based system having appropriate processing capability, and against any remotely or locally linked WMI environment, including a WMI environment present on the system on which the utility itself is executing, as indicated above.

Exemplary Computer Used to Implement Management and Target Stations

The management station 202 and one or more target stations 204 of FIG. 2, may be implemented as various computing devices, such as Windows NT® operating system servers, desktop personal computers, workstations, laptop computers, notebook computers, handheld PCs, and the like.

Figure 3:
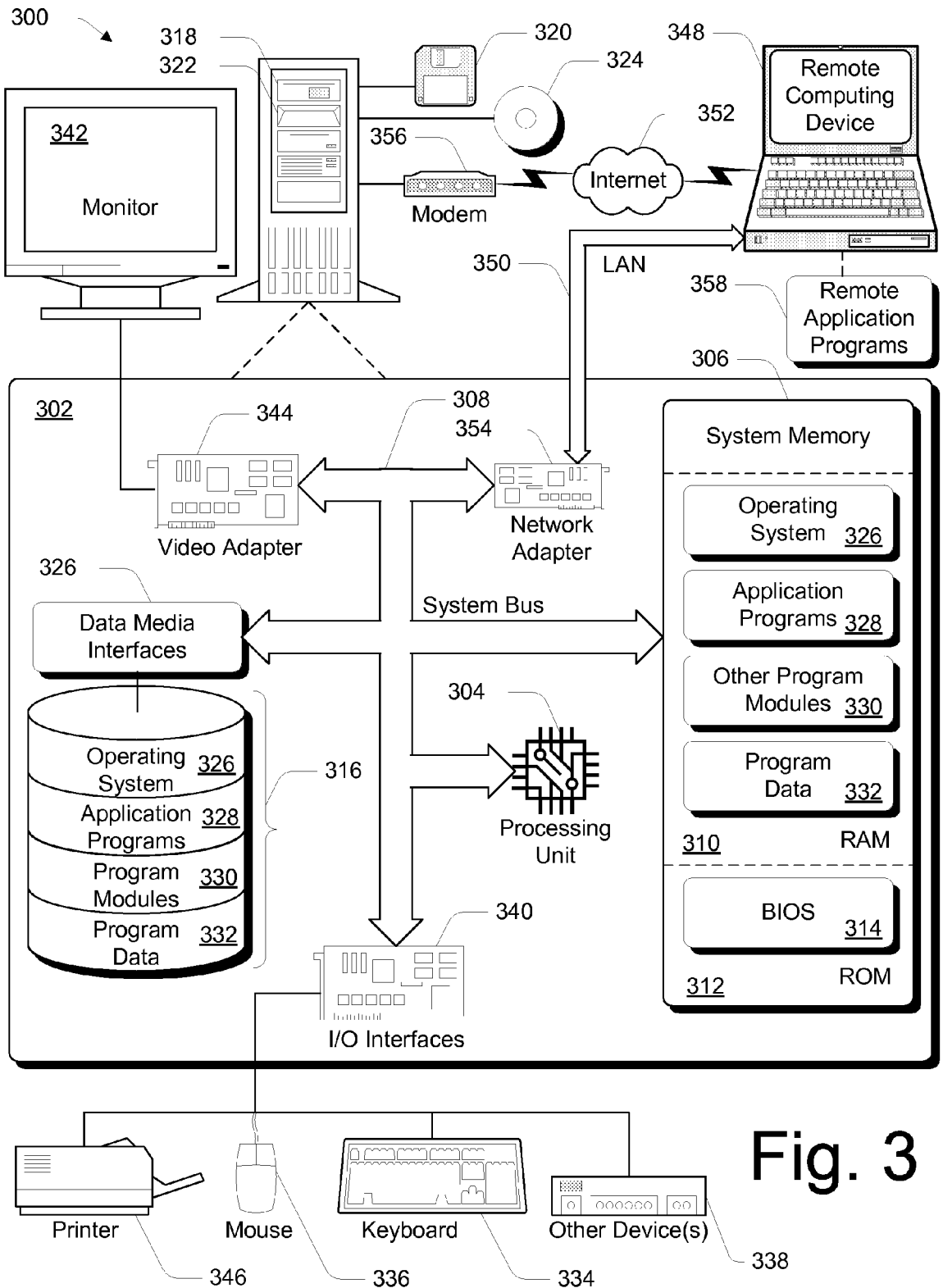
FIG. 3 illustrates an exemplary computing environment that is suitable for implementing computer and network architectures such as the management and target stations of FIG. 2.

FIG. 3 illustrates an example of a computing environment 300 which is suitable for implementing, either fully or partially, computer and network architectures described herein, such as the management station 202 and the one or more target stations 204 of FIG. 2. The exemplary computing environment 300 is only one example of a computing system, and is not intended to suggest any limitation as to the scope of use or functionality of the network architectures. Neither should the computing environment 300 be interpreted as having any dependency or requirement relating to any one or combination of components illustrated in the exemplary computing environment 300.

The computer and network architectures can be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Caching user network access information may be described in the general context of computer-executable instructions, such as program modules, being executed by a computer. Generally, program modules include routines, programs, objects, components, data structures, etc. that perform particular tasks or implement particular abstract data types. Caching network access information may also be practiced in distributed computing environments where tasks are performed by remote processing devices that are linked through a communications network. In a distributed computing environment, program modules may be located in both local and remote computer storage media including memory storage devices.

The computing environment 300 includes a general-purpose computing system in the form of a computer 302. The components of computer 302 can include, but are not limited to, one or more processors or processing units 304, a system memory 306, and a system bus 308 that couples various system components including the processor 304 to the system memory 306.

The system bus 308 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer system 302 typically includes a variety of computer readable media. Such media can be any available media that is accessible by computer 302 and includes both volatile and non-volatile media, removable and non-removable media. The system memory 306 includes computer readable media in the form of volatile memory, such as random access memory (RAM) 310, and/or non-volatile memory, such as read only memory (ROM) 312. A basic input/output system (BIOS) 314, containing the basic routines that help to transfer information between elements within computer 302, such as during start-up, is stored in ROM 312. RAM 310 typically contains data and/or program modules that are immediately accessible to and/or presently operated on by the processing unit 304.

Computer 302 can also include other removable/non-removable, volatile/non-volatile computer storage media. By way of example, FIG. 3 illustrates a hard disk drive 316 for reading from and writing to a non-removable, non-volatile magnetic media (not shown), a magnetic disk drive 318 for reading from and writing to a removable, non-volatile magnetic disk 320 (e.g., a "floppy disk"), and an optical disk drive 322 for reading from and/or writing to a removable, non-volatile optical disk 324 such as a CD-ROM, DVD-ROM, or other optical media. The hard disk drive 316, magnetic disk drive 318, and optical disk drive 322 are each connected to the system bus 308 by one or more data media interfaces 326. Alternatively, the hard disk drive 316, magnetic disk drive 318, and optical disk drive 322 can be connected to the system bus 308 by a SCSI interface (not shown).

The disk drives and their associated computer-readable media provide non-volatile storage of computer readable instructions, data structures, program modules, and other data for computer 302. Although the example illustrates a hard disk 316, a removable magnetic disk 320, and a removable optical disk 324, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 316, magnetic disk 320, optical disk 324, ROM 312, and/or RAM 310, including by way of example, an operating system 326, one or more application programs 328, other program modules 330, and program data 332. Each of such operating system 326, one or more application programs 328, other program modules 330, and program data 332 (or some combination thereof) may include an embodiment of a caching scheme for user network access information.

Computer system 302 can include a variety of computer readable media identified as communication media. Communication media typically embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

A user can enter commands and information into computer system 302 via input devices such as a keyboard 334 and a pointing device 336 (e.g., a "mouse"). Other input devices 338 (not shown specifically) may include a microphone, joystick, game pad, satellite dish, serial port, scanner, and/or the like. These and other input devices are connected to the processing unit 304 via input/output interfaces 340 that are coupled to the system bus 308, but may be connected by other interface and bus structures, such as a parallel port, game port, or a universal serial bus (USB).

A monitor 342 or other type of display device can also be connected to the system bus 308 via an interface, such as a video adapter 344. In addition to the monitor 342, other output peripheral devices can include components such as speakers (not shown) and a printer 346 that can be connected to computer 302 via the input/output interfaces 340.

Computer 302 can operate in a networked environment using logical connections to one or more remote computers, such as a remote computing device 348. By way of example, the remote computing device 348 can be a personal computer, portable computer, a server, a router, a network computer, a peer device or other common network node, and the like. The remote computing device 348 is illustrated as a portable computer that can include many or all of the elements and features described herein relative to computer system 302.

Logical connections between computer 302 and the remote computer 348 are depicted as a local area network (LAN) 350 and a general wide area network (WAN) 352. Such networking environments are commonplace in offices, enterprise-wide computer networks, intranets, and the Internet. When implemented in a LAN networking environment, the computer 302 is connected to a local network 350 via a network interface or adapter 354. When implemented in a WAN networking environment, the computer 302 typically includes a modem 356 or other means for establishing communications over the wide network 352. The modem 356, which can be internal or external to computer 302, can be connected to the system bus 308 via the input/output interfaces 340 or other appropriate mechanisms. It is to be appreciated that the illustrated network connections are exemplary and that other means of establishing communication link(s) between the computers 302 and 348 can be employed.

In a networked environment, such as that illustrated with computing environment 300, program modules depicted relative to the computer 302, or portions thereof, may be stored in a remote memory storage device. By way of example, remote application programs 358 reside on a memory device of remote computer 348. For purposes of illustration, application programs and other executable program components, such as the operating system, are illustrated herein as discrete blocks, although it is recognized that such programs and components reside at various times in different storage components of the computer system 302, and are executed by the data processor(s) of the computer.

Exemplary System Architecture to Implement a WMI Command Line Utility

Figure 4:
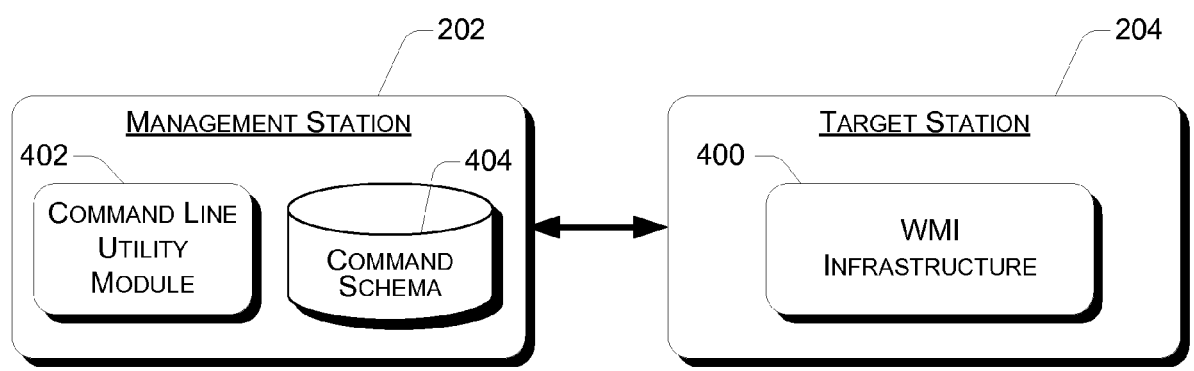
FIG. 4 illustrates an exemplary software/hardware architecture within the management station of FIG. 2.

FIG. 4 illustrates an exemplary software/hardware architecture within the management station 202 that is part of the exemplary system environment 200 of FIG. 2. This architecture operates to provide access to WMI functionality exposed through the WMI infrastructure 400 present on a target station 204. The architecture includes a WMI command line utility module 402 and a command schema 404 on the management station 202.

The WMI infrastructure 400 is known, and is presumed to be present on the target system 204. In general, the WMI infrastructure 400 provides uniform access to management information on Windows-based systems by representing or exposing systems, applications, networks, and other managed components using the Common Information Model (CIM), designed by the Distributed Management Task Force (DTMF). CIM can model anything in the managed environment regardless of data source location. In addition to data modeling, the WMI infrastructure 400 exposes a powerful set of base services that include query-based information retrieval and event notification. An object model application programming interface (API) provides access to these services and management data, and until now, that access generally required administrators and developers to develop script and other WMI applications.

The WMI command line utility module 402, however, permits access to the WMI functionality without the need for writing such applications. The WMI command line utility module 402 provides a command line interface permitting the entry of command and control functions that are based on and operate against the target WMI schema exposed through the WMI infrastructure 400 which represents the systems, applications, networks, and other managed components of a target system 204.

Figure 5:
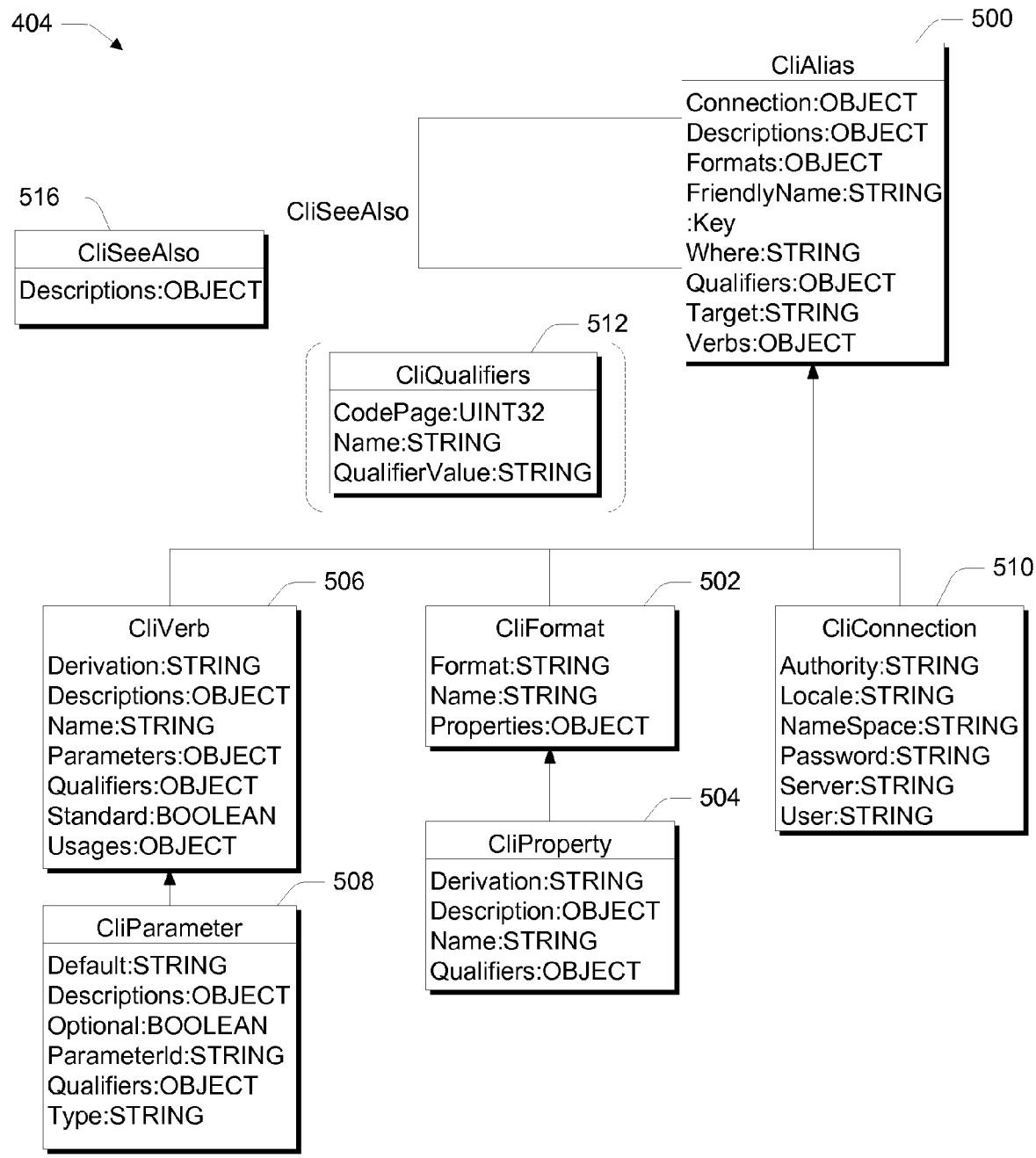
FIG. 5 illustrates the command schema that underlies a WMI command line utility and defines the utility commands.

The WMI schema exposed by the WMI infrastructure 400 is made visible to the user of the WMI command line utility at a management station 202 through an intermediate alias object. An alias object is effectively a command that is executed on the command line utility in order to capture the features of a target WMI class and to facilitate a specific administrative task, such as managing a system process, configuring a netcard, or discovering CPU utilization. Alias objects are instances of well-defined, command-related classes that are organized into a command schema 404, as illustrated in FIG. 5. The command schema 404 drives the WMI command line utility and defines the commands used in the utility. That is, the command line utility uses the class definitions or aliases in the command schema 404 to interpret the command information entered by a user and apply that command interpretation against the target WMI schema.

The WMI command line utility and its underlying command schema 404 also permit the organization of commands by roles, so that administrators needing to perform specific administrative tasks are able to focus on a specific set of commands without being faced with the complete set of commands that make up the entire command schema 404. The command schema 404 is logically located in a default namespace structure on the management station 202, although it can exist in any namespace on any machine and is not limited to the management station 202. The namespace structure provides a logical grouping of classes and class instances that is intended to reflect the organization of a company's operational environment. Since the operational environment can differ significantly from one company to the next, it is expected that the corresponding namespace structures will also vary substantially from one organization to another. Thus, a given organization is able to organize commands based on suitable administrative roles by creating logical namespace in which relevant alias objects or command class instances can be found.

An example of a default namespace structure in which the command schema 404 might be located is shown below in Table 1. The first column of Table 1 indicates the path a user follows to find the namespace in which command alias definitions relevant to a particular administrative role can be found. The namespace generally indicates by its name, what types of role-oriented commands will be located in the namespace. The second column of table 1 indicates more clearly what tasks these commands help the user accomplish.

TABLE 1

Default Namespace Structure

| Namespace Path | Task |
| --- | --- |
| \\root\cli | |
|   Network | manage the network subsystem namespace |
|   Apps | manage applications namespace |
|   System | manage operating system namespace |
|     Processor | manage the network subsystem <alias> |
|     Bios | manage BIOS functions |
|     Disks | manage storage |
|     LogDrives | manage logical drive partitions |
|     Process | manage operating processes |
|     Service | manage system services |
|     DCOM | manage DCOM Configuration |
|     Scheduling | manage jobs |
|   Devices | manage devices namespace |
|     Printer | manage printers |
|   Users | manage users namespace |
|     Accounts | manage users accounts |
|   Database | manage databases namespace |
|     Transaction | manage system processes |
|       Start | start a transaction |
|       Stop | stop a transaction |

In addition to being able to organize commands into roles, the schema-based WMI command line utility permits a user to tailor commands to suit particular network needs. For example, properties of an alias object (i.e., a command) can be arranged in named formats that include property values that can be formatted for display according to a specific presentation strategy. Thus, an alias might have a BRIEF format that displays only the property values that are essential for the identification of the target WMI schema objects visible through the alias.

The schema-based WMI command line utility is also extensible and condensable. New commands can be generated based on specific network requirements, or in order to accommodate a progressing target WMI schema. Generating new commands through the creation of additional aliases or command class instances, or eliminating commands from a standard set of commands, permits organizations to establish specific command sets aimed at various network administration roles within their organization. This improves upon the conventional command line approach, where a program is written which defines the command line commands. Under the conventional approach, the source code is inaccessible to the user, and generating a new command for the command line requires writing a whole new program.

Finally, although the command schema 404 is described herein as being embodied in a command line interface utility, the command schema 404 itself is not limited to supporting a command line interface utility. The command schema 404 is designed to operate as a mapping between the target WMI schema and some set of commands. The embodiment of those commands can vary and does not affect the mapping function of the command schema 404. Therefore, the WMI command line utility described herein is simply a particular manifestation of this mapping, and other embodiments are contemplated. Such embodiments include but are not limited to graphical user interfaces, free form languages, and other application interfaces, all driven by an underlying command schema 404.

Command Line Utility Schema

Referring now to FIG. 5, the command schema 404 which underlies the WMI command line utility and defines the utility commands is illustrated. Although a particular command schema 404 is described, additional schemas having differing class arrangements that are designed to provide a mapping between command functions and the target WMI schema are contemplated.

In general, the command schema 404 includes a collection of classes which forms a template that is used to represent information about command aliases. The template can be filled-in during a command line session to define specific command aliases or class instances. An example command alias is fully described in the MOF (managed object format) file listed in Appendix A. The principal class in the command schema 404 is the CliAlias (i.e., command line interface alias) class 500. Each instance of the CliAlias represents a single alias or command. As indicated above, aliases are organized into role oriented namespaces so that aliases required by a specific operational role will all be found together. As an example, all the printer management aliases will be found in the "\\.\root\cli\printer" namespace.

Each alias or instance of the CliAlias class 500 has a FriendlyName, a list of Formats, a list of Verbs, a Description, a Target, a Connection, a list of Qualifiers, and a Where property. The "FriendlyName" string in the CliAlias class 500 provides a unique name for an alias in the context of the namespace in which that alias is defined. Since the terms CLASS, WHERE, PATH, and EXIT, appear in the same location as the alias names within the WMI command line syntax (described below), they cannot be used as alias names. In general, these terms are command line expressions indicating paths, commands, and queries as discussed below regarding the WMI command line syntax.

The "Formats" attribute within the CliAlias class 500 provides a list of formats for an alias. Each alias therefore has a list of formats which provide various display strategies for the alias. Examples of formats include FULL, BRIEF, INSTANCE, or a user-defined qualifier. In addition, each format includes the list of properties that are to be displayed using the given format. Thus, the FULL format would display the full set of properties available for the alias, while the BRIEF format would display a lesser set of those properties.

The "Verbs" attribute within the CliAlias class 500 provides a list of verbs for an alias. The verbs in the list each represent a particular behavior that the alias understands or that is supported by the alias. For example, a "process" alias, representing all the processes running on a target system 204, may support a verb called "kill", which would permit a user to kill a process running on a target system 204.

The "Target" string within the CliAlias class 500 defines the object on the target system 204 against which the alias will operate. The Target string may be a query in Windows® Management Instrumentation Query Language (WQL) or a valid path (which may be just a class name), both of which will define the instance or set of instances on the target system 204 to which the alias applies. Since an alias exists by virtue of the target object on which it operates, the target object essentially defines the alias' relationship to the command schema 404. That is, the logical location of an alias in the namespace structure representing the command schema 404, is determined based on the administrative role to which the target object applies.

The "Where" string within the CliAlias class 500 defines a from/where WQL query clause. The query string may contain substitution parameters indicating where values may be substituted into the query string. The parameter values are taken from a token value immediately following the alias name in the command line syntax (described below). An example command using the "process" alias briefly described above would be, "wmic Kill Process 154 From Win32_process Where ProcessId=#ProcId".

Additional attributes within the CliAlias class 500 include the "Connection" object which defines parameters required when connecting to the WMI infrastructure 400, the "Description" object which provides a description of the alias, and the "Qualifiers" object which provides qualifiers applicable to the alias which influence the handling of the target system 204 object on which the alias will operate.

Referring again to FIG. 5, the CliFormat class 502 is a class associated with the CliAlias class 500 within the command schema 404. Lines between the classes indicate this association An instance of the CliFormat class 502 represents a list of properties that will be returned on a query processed through an alias (i.e., a CliAlias class 500 instance). An instance of the CliFormat class 502 inherits a format as its "Name" string from the list of formats defined in an alias. Thus, the Name string for a CliFormat class 502 instance would be one of the system-defined formats, FULL, BRIEF, or INSTANCE, or it may be an arbitrary user-defined format. An instance of the CliFormat class 502 also inherits from the alias, the list of properties to be displayed for the given format type. A "Format" string within a CliFormat class 502 instance provides the location of an XSL (extensible style sheet language) file that can be used to format the display for the list of properties being returned to the user through the alias. In a typical embodiment, the WMI command line utility returns information as XML (extensible markup language) documents which can then be processed using XSL to render reports for the user in multiple formats as determined by a particular XSL file located through the Format string. Thus, any display strategies to be used in displaying properties returned through an alias, such as truncation lengths or numeric values, will be defined in the XSL style sheet located by the Format string. Examples of XSL files representing style sheets used in formatting displays are located in Appendix B.

The CliProperty class 504 is used by the CliFormat class 502 within the command schema 404. An instance of the CliProperty class 504 describes a value for a property that is to be returned for a given format type (i.e., FULL, BRIEF, INSTANCE, or user-defined format). Each property, or instance of the CliProperty class 504, has a "Name", a "Description", a "Derivation", and "Qualifiers". The Name string provides the name of the property to be displayed. The Description provides a description of the property. The Derivation string provides an expression that will be used by the WMI command line utility to derive the actual value for the property to be displayed. The Derivation is either the name of a property within the target system 204 object (from the target WMI schema) defined by the alias, a constant value (i.e., a numeric, a string, or a date time or Boolean literal), or a command line command such as "Get", which returns a value to be used for the property. Qualifiers contains any qualifier applicable to the alias which influences the handling of the target system 204 object on which the alias will operate.

Another class associated with the CliAlias class 500 is the CliVerb class 506. An instance of the CliVerb class 506 defines the verb or behavior associated with an alias (i.e., a CliAlias class 500 instance). An instance of the CliVerb class 506 has a "Name" string. The Name string defines the actual function to be invoked when the verb is used in the alias command. The function may be from a fixed list of system-defined standard functions including CALL, SET, LIST, GET, and ASSOCIATE, or it may be a verb that is implemented by the invocation of a method on the target system 204 object defined by the alias or an invocation of a command line utility. Each instance of the CliVerb class 506 has a "Standard" Boolean which indicates whether the verb is a standard verb or a method invoked on the target object. In addition, each instance provides a "Derivation" string which represents the name of the standard verb or the name of the method from the target object on which the verb is based or the text required for the invocation of a command line utility.

Additional attributes within an instance of the CliVerb class 506 include a "Description" string which provides a description of what the verb does, a "Usage" object which provides a description of how the verb should be called, a "Qualifiers" object which provides qualifiers applicable to the alias which influence the handling of the target system 204 object on which the alias will operate, and a "Parameters" object which describes the parameters accepted by the verb. Each verb has a list of parameters (which may be empty) that is accepted by that verb.

The CliParameter class 508 is used by the CliVerb class 506 within the command schema 404. An instance of the CliParameter class 508 represents a parameter accepted by a verb. Each instance of the CliParameter class 508 defines the name of the parameter, the default value for the parameter, the parameter type, and whether or not the parameter is optional. A "ParameterID" string provides the formal name for the parameter. A "Type" string defines the format expected for any value supplied for the parameter. A "Default" string defines a default value used for the parameter if the user does not supply any actual value, and an "Optional" Boolean indicates whether the parameter may be omitted.

Additional attributes within an instance of the CliParameter class 508 include a "Description" string which provides a description of the parameter, and a "Qualifiers" object which provides qualifiers applicable to the alias which influence the handling of the target system 204 object on which the alias will operate.

Another type used by the CliAlias class 500 is the CliConnection class 510. An instance of the CliConnection class 510 defines parameters to be used with an alias (i.e., a CliAlias class 500 instance) when establishing a connection to the target system 204 object against which the alias will operate. Connections may vary from alias to alias, and not all of the connection parameters of the CliConnection class 510 are always specified. Any parameters that are not specified may be provided using global switches (described below under command line syntax). Otherwise, values for parameters that are not specified will default to the current value for the current command utility session. If no current value is available, the user will be prompted with an error.

An optional "Server" string is included in the CliConnection class 510 which specifies the computer name when accessing a remote computer using DCOM (Distributed Component Object Model). If this parameter is not provided, the default is the local computer. A "Namespace" string specifies the namespace on the target system 204 to which a user logs on. The default namespace is that which has been configured as the default namespace for WMI scripting. A "User" string specifies the user name to use while attempting to connect to a target system 204. This string can be in the form of a user name or Domain\\Username. Its default value is the currently logged-on user name. The "User" parameter is only used with connections to remote WMI servers. A connection attempt that specifies a User for a local WMI connection will fail. A "Password" string specifies the password to use when attempting to connect to a target system 204. Its default value is the password of the currently logged-on user. The "Password" parameter is only used with connections to remote WMI servers. A connection attempt that specifies a Password for a local WMI connection will fail. A "Locale" string specifies the localization (language) code. The default localization code is the current locale. Otherwise, this parameter must be a string that indicates the desired locales in which information should be retrieved. An "Authority" string determines the authentication to be used when establishing a connection to a target system 204. Kerberos authentication is used if the parameter begins with the string "kerberos". If the string parameter begins with anything other than "kerberos", then NTLM authentication is used and an NTLM domain name must be provided in the string. If the parameter is left blank, the operating system negotiates with DCOM to determine whether NTLM of Kerberos authentication is used. The "Authority" parameter is only used with connections to remote WMI servers. A connection attempt that specifies an Authority for a local WMI connection will fail.

An instance of the CliQualifiers class 512 represents qualifiers applicable to the alias which influence the handling of the target system 204 object on which the alias will operate. The qualifiers are drawn from the qualifiers on the underlying target system 204 object. Examples of qualifiers include ValueMap used as a constraint on the values that may be used with a verb such as the SET verb, and MaxLen used as a constraint on the number of characters that can be provided using the SET verb. The "Name" string attribute of the CliQualifiers class 512 provides the name of the qualifier, and it must be unique within the set of qualifiers for the object to which the qualifier applies. The "QualifierValue" string provides the value for the qualifier. There may be one or more values depending on whether the qualifier is localized or not. The "CodePage" value represents the code page for which the qualifier is localized.

The command schema 404 includes a CliSeeAlso association 516, which associates an alias with other aliases that may be of related interest to the WMI command line user. A "Description" attribute in the CliSeeAlso association 516 describes a relationship between an alias and related aliases that may be used as a part of the same role.

WMI Command Line Utility Syntax

Figure 6A:
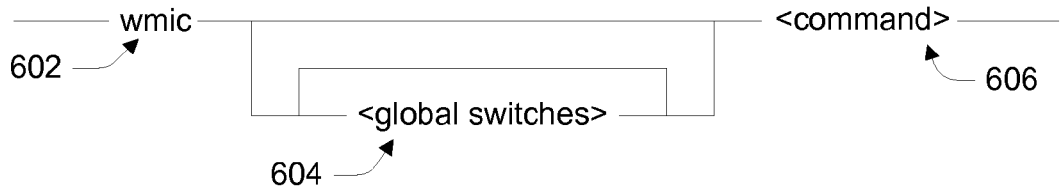
FIGS. 6A-6E illustrate the basic structure of a WMI command line syntax for entering commands into a WMI command line.

FIG. 6A illustrates the basic structure of the WMI commands 600 entered into the WMI command line. The formal notation describing the syntax of the WMI command line utility is listed in the Command Line BNF (Backus Naur Form) provided in Appendix C. Most authors writing about a new programming language use BNF to specify the syntax rules of the language.

The structure of the command line syntax includes a "wmic" as the WMI command line prompt 602, followed by a global switches category 604 which generally represents parameters set by a user to define the current operational state of the command, followed last by the command category 606. The "wmic" command prompt 602 permits a user to enter all the arguments in the command line necessary to complete a command, enter an incomplete portion of the command and get help on completing the command, or enter just the command name itself in order to go into an interactive mode. The interactive mode allows the user to enter multiple commands while sharing the same WMI connection, and it is terminated with an "exit" command.

Figure 6B:
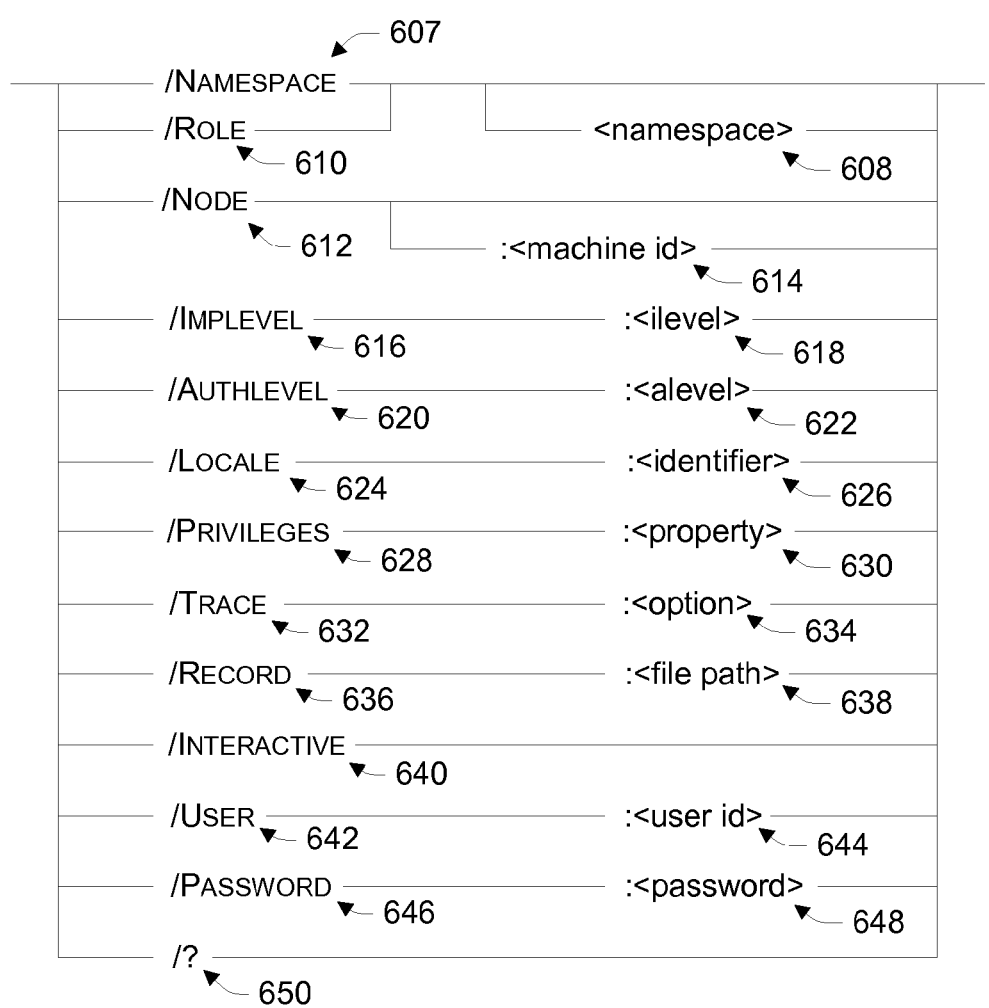

The global switches category 604 is further illustrated in FIG. 6B. Global switches 604 permit a user to parameterize commands by specifying such things as the namespace locations of command definitions (i.e., aliases) and target system 204 objects, user impersonation and authentication levels, user and password identifications, and the like. Several of the global switches 604 relate to locations where command aliases and target objects to be used in a command line session will be found, as well as the machines on which these objects exist.

The "/NAMESPACE" 607 global switch permits a user to enter the "<namespace>" path 608 for the target namespace (i.e., the target system 204 object) that the alias command is to operate against. Namespaces are always relative to the current namespace of the command line utility session unless the namespace path 608 being entered begins with "\\". For example, if the namespace for the current session is "\\.\root\cimv2", and the global switch "/NAMESPACE applications" is entered, this global switch entry is equivalent to "/NAMESPACE\\.\root\cimv2\applications". Similarly, the "/ROLE" 610 global switch permits a user to enter the "<namespace>" path 608 for the role which contains the alias command definitions to be available for the command line utility session. As indicated above in the exemplary default namespace structure of Table 1, the default namespace for a "/ROLE" 610 global switch is "\\root\cli". The "/NODE" 612 global switch permits a user to specify which server or machine 614 (i.e., target station 204 of FIG. 2) the alias will operate against. The "/NODE" 612 switch can take more than one server name as a parameter, and subsequent commands will be applied to all the servers in the list of names.

The "/IMPLEVEL" 616 global switch permits a user to set the level that the command line utility is to impersonate when connecting to a target station 204. Whenever a connection is established, user credentials are passed to the WMI infrastructure 400 present on a target station 204. To ensure a user does not perform any actions that are not allowed, the WMI infrastructure 400 impersonates the user credentials before attempting to fulfill any request. Table 2 lists the impersonation levels and the associated "ilevel" 618 values a user would enter. The default value is 3.

TABLE 2

Impersonation Levels

| Impersonation Level | "ilevel" Value |
| --- | --- |
| Anonymous | 1 |
| Identify | 2 |
| Impersonate | 3 |
| Delegate | 4 |

The "/AUTHLEVEL" 620 global switch permits a user to set the level that the command line is to authenticate when calls are made against the WMI infrastructure 400. Authentication is a process of verifying that a user with a unique name is the actual user that the name implies. Table 3 lists the authentication levels and their meanings, along with the associated "alevel" 622 values a user would enter.

TABLE 3

Authentication Levels

| Authentication Level | "alevel" Value | Meaning |
| --- | --- | --- |
| Default | 0 | WMI uses the default Windows authentication setting. |
| None | 1 | Uses no authentication. |
| Connect | 2 | Authenticates the credentials of the client (user) only when the client establishes a relationship with the target server. |
| Call | 3 | Authenticates only at the beginning of each call when the server receives the request. |
| Pkt | 4 | Authenticates that all data received is from the expected client. |
| PktIntegrity | 5 | Authenticates and verifies that none of the data transferred between client and server has been modified. |
| PktPrivacy | 6 | Authenticates all previous impersonation levels and encrypts the argument value of each remote procedure call. |

The "/LOCALE" 624 global switch permits a user to specify which language "identifier" 626 the command line utility should use. The parameter for the "/LOCALE" 624 switch is the hexadecimal form of the locale "identifier" 626. For example, to specify U.S. English as the language, the parameter is 409, and to specify Finnish as the language, the parameter is 40b.

Additional global switches 604 include the "/PRIVILEGES" 628 switch which allows the user to enable or disable specific Windows NT® and Windows 2000 privileges using a "property" 630 parameter, the "/TRACE" 632 global switch "option" 634 which permits a user to have debug information output to stderr during the processing of requests, and the "/RECORD" 636 global switch which allows the user to enter a "file path" 638 where all commands and output entered in the WMI command line will be logged. An "/INTERACTIVE" 640 global switch makes the whole command line session interactive as discussed above. The "/USER" 642 switch permits entry of a "user id" 644 for the command line session, and the "/PASSWORD" 646 switch provides the "password" 648 to be used in logging on to the command line session.

Finally, the "/?" 650 global switch is the syntax for accessing the WMI help commands. Examples for using the WMI help command "/?" 650 switch are shown below in Table 4.

TABLE 4

Displaying WMI Help Commands

| Syntax | Meaning |
| --- | --- |
| /? | Displays WMI commands and parameter usage(s) and help options listed in this table. |
| /?:Brief | Determines the help display. In the case of an alias, BRIEF displays description text for the alias plus the verbs and formats available for the alias. In the case of a verb, BRIEF provides the usage text. |
| /?:Full | Determines the help display. In the case of an alias, FULL provides the description for the alias together with the descriptions for all its formats and verbs. |
| $wmic/? | Outputs all aliased objects or methods to the screen with a brief description, limited to 48 characters, followed by ". . ." (outputs the same information regardless of brief or full specification). |

Figure 6C:
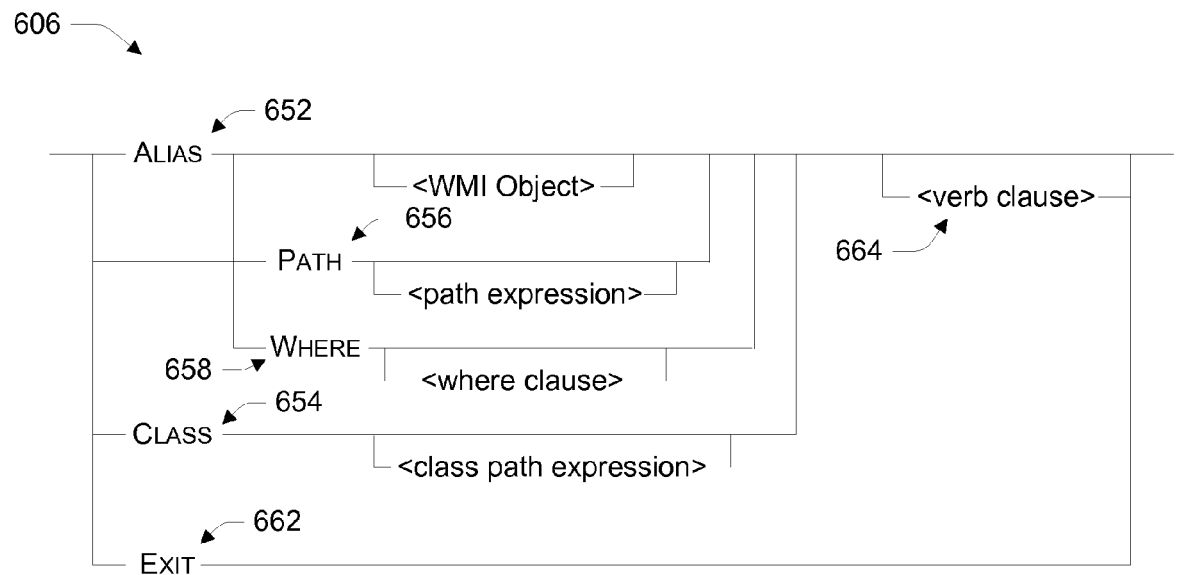

The last category in a WMI command line entry is the command category 606, and its syntax is illustrated in FIG. 6C. The entry for the command category 606 is either an alias 652, defined by the underlying CliAlias class 500 instance associated with the alias name (FIG. 5), or a standard command. The standard commands include CLASS, PATH, WHERE, and EXIT. The alias 652 name will be unique in the context of the namespace in which the alias is defined. The standard command names, CLASS, PATH, WHERE, and EXIT cannot be used for the alias 652 name because they appear in the same location in the syntax, as illustrated in FIG. 6C.

A user can escape to the full WMI schema using the CLASS 654 command and by providing a class path expression. Similarly, the PATH 656 command allows a user to escape to the full WMI object paths by providing a path expression. Full WMI WQL query capabilities are also available through the WHERE 658 command.

Figure 6D:
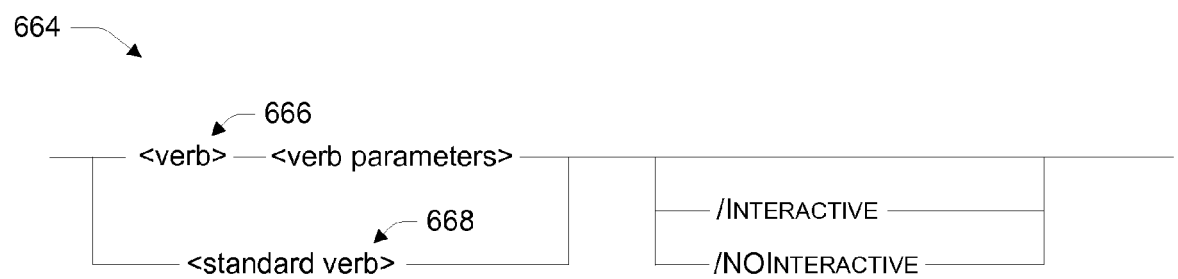

The syntax for the verb clause category 664 within the command category 606 is further illustrated in FIG. 6D. The verb entry 666 may be from a fixed list of system-defined standard verbs 668 including CALL, SET, LIST, GET, and ASSOCIATE, or it may be a verb that is implemented by the invocation of a method on the target system 204 object defined by the alias.

Figure 6E:
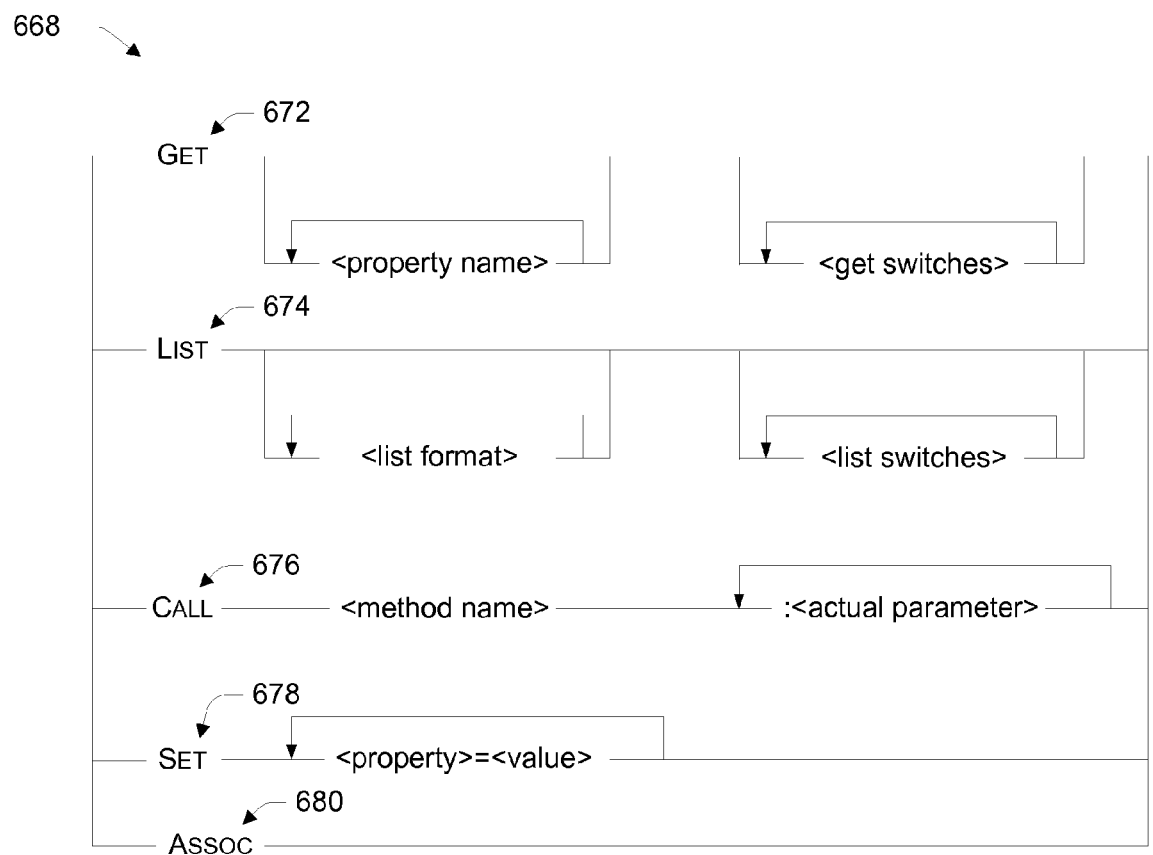

The syntax for the standard verb category 668 within the verb clause 664 is further illustrated in FIG. 6E. The GET verb 672 displays properties for the named properties based on whatever switches are defined for the get switches category. For example, the /VALUE switch will format the output using the following style sheet:

$WINDIR\system32\wbem\WmiCliValueFormat.xsl

If the /ALL switch is used, the output is formatted using the following style sheet:

$WINDIR\system32\wbem\WmiCliTableFormat.xsl

Similarly, the LIST verb 674 shows data based on a specified format which comes from the list, BRIEF, INSTANCE, SYSTEM, STATUS, FULL, or a user defined format. These formats returns varying sets of properties for display. The other standard verbs include CALL 676, which calls on specified methods and execution operations, SET 678, which sets user-specified values for specified properties, and ASSOC 680, which returns the result of a query.

Examples of WMI command line processing using the various syntax described herein above are listed in Appendix D.

Exemplary Method for Implementing the WMI Command Line Utility

Figure 7:
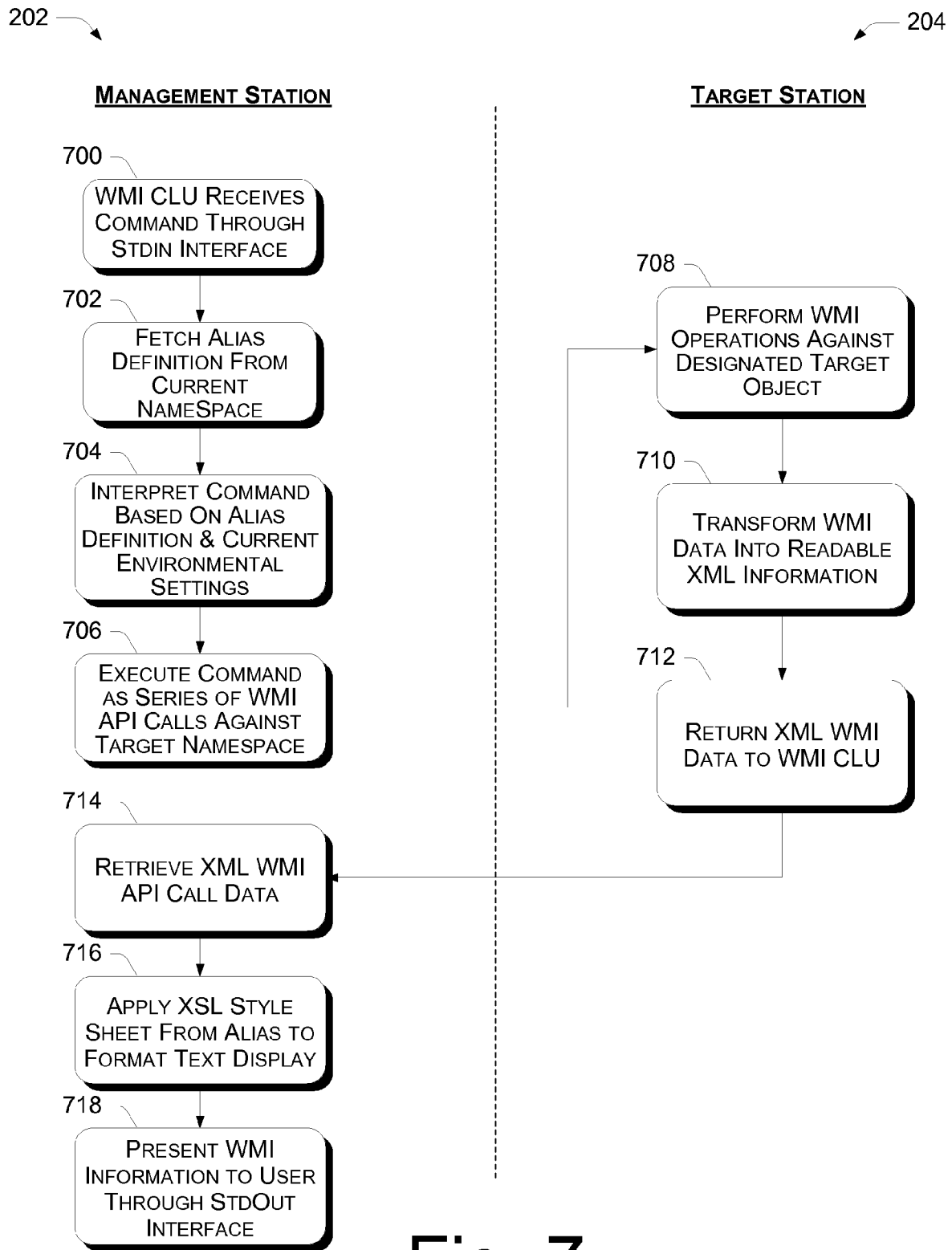
FIG. 7 shows a flowchart illustrating the general method of operation between the management station and a target station of FIG. 2.
Figure 8:
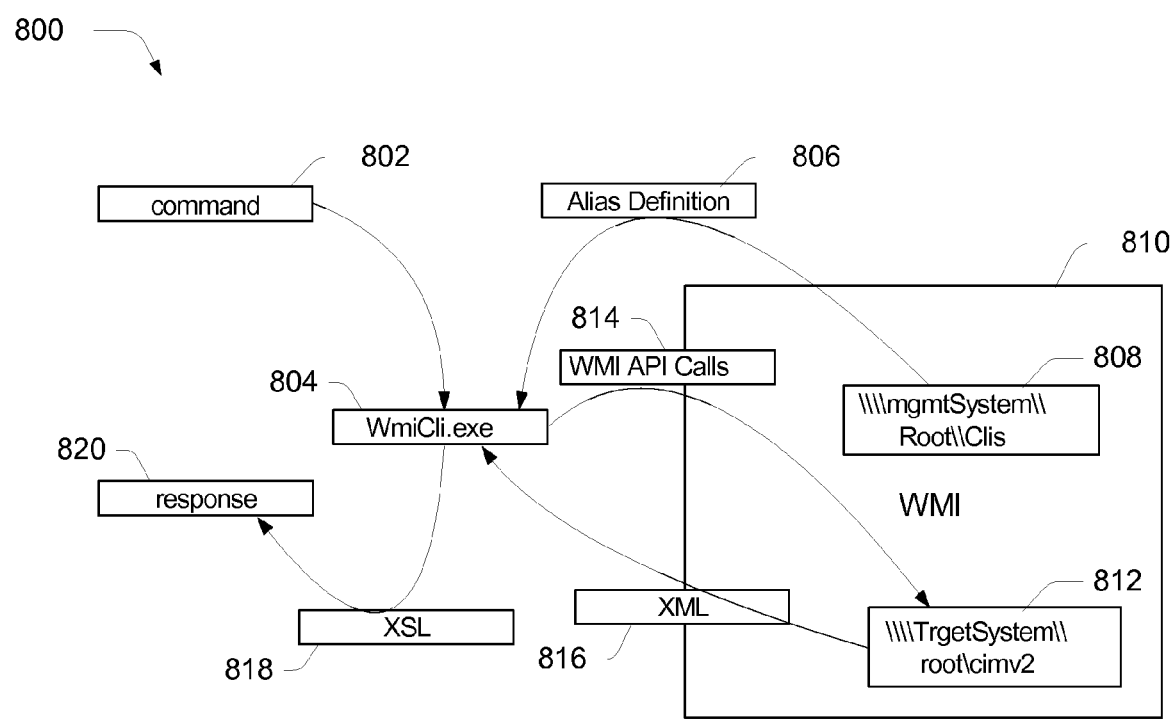
FIG. 8 illustrates the general architecture of the WMI command line utility.

An example method of operation for an exemplary WMI command line utility and underlying command schema will now be presented with primary reference to FIGS. 7 and 8. FIG. 7 shows a flowchart illustrating the general method of operation between the management station 202 and a target station 204, while FIG. 8 illustrates the general architecture 800 of the WMI command line utility. The method will be described with parallel reference to the flowchart of FIG. 7 and the utility architecture 800 of FIG. 8.

The method begins at operation 700 with a command being received through a stdin interface by the WMI command line utility. As illustrated by the utility architecture 800 of FIG. 8, the command 802 is entered into a command line and actually received by an executable file 804 within the WMI command line utility. The utility, through the executable file 804, then performs a series of operations on the command.

At operation 702, the definition for an alias named in the command is fetched from the current operating namespace location. This is illustrated in the utility architecture 800 of FIG. 8 by the alias definition 806 following the curved arrow from the "\\\\mgmtsystem\\root\\cli" 808 namespace back to the executable file 804. As described above, the user switches between namespaces through global switches 604 made using the proper command line syntax. The default namespace on the management station 202 is the "\\\\mgmtsystem\\root\\cli" 808 namespace. In FIG. 8, the system 810 represents both the management station 202 and the target station 204 and indicates that the WMI command line utility may operate against a WMI schema located on either station. In general however, the "\\\\mgmt system\\root\\cli" 808 namespace will be located on the management station 202 and the "\\\\trgetsystem\\root\\cimv2" 812 namespace will be located on the target station 204.

Continuing with operation 704 (FIG. 7), the utility then interprets the command based on the alias definition 806 and additional current environmental settings which have been set by the user, such as other global switch 604 settings. At operation 706, the utility executes the command as a series of WMI API calls against a target namespace, such as "\\\\trgetsystem\\root\\cimv2" 812 of FIG. 8. Although the target namespace is illustrated as "\\\\trget system\\root\\imv2" 812, any namespace may be used as a target so long as that namespace is consistent with the alias being processed. Operation 706 is illustrated in the WMI command line utility architecture 800 by the WMI API Calls 814 box following the curved arrow from the executable file 804 to the "\\\\trgetsystem\\root\\cimv2" 812 namespace.

The method continues at operation 708, with the WMI infrastructure 400 on the target station 204 performing the called out WMI operations against the target object or namespace. The WMI data retrieved through the API calls is then transformed at operation 710 into XML information that is readable by the WMI command line utility. The WMI data is then returned in XML to the command line utility at operation 712. The operations 710 and 712, transforming the WMI data into XML and returning it to the WMI command line utility are illustrated in the utility architecture 800 of FIG. 8 by the XML 816 box following the curved arrow from the "\\\\trgetsystem\\root\\cimv2" 812 namespace back to the executable file 804.

The WMI command line utility receives the WMI XML data at operation 714 and applies an XSL style sheet to format the text for display to the user at operation 716. The XSL style sheet used is based on the XSL file designated through the format specifications within the alias. At operation 718, the WMI information is presented to the user through the stdout interface. The operations 716 and 718, applying an XSL style sheet to format the display and presenting the WMI information for display to the user are illustrated in the utility architecture 800 of FIG. 8 by the XSL 818 box following the curved arrow from the executable file 804 to the response box 820.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A method comprising:
receiving at an executable file a command entered into a command line interface;
switching from at least a first namespace to a second namespace in response to a global switch in the command, wherein the global switch permits a user to set an authentication level that the command line interface is configured to authenticate when Application Program Interface calls are made;
retrieving Windows Management Instrumentation (WMI) data through an application program interface (API) call that is placed based on at least the second namespace specified by the global switch;
transforming the retrieved WMI data into an extensible markup language (XML) form and returning the XML form to the command line interface;
applying an extensible style sheet language (XSL) to the XML form to format the WMI data, wherein the XSL style sheet is based on an XSL file designated through format specifications; and
presenting the formatted WMI data through the command line interface;
wherein a WMI command line enables a user to enter a command to go into an interactive mode, wherein the interactive mode enables the user to enter multiple commands while sharing a same WMI connection, and to terminate the interactive mode with an exit command;
wherein the receiving, switching, retrieving, transforming, applying and presenting are performed by at least one processor.

2. The method of claim 1, wherein the first namespace is located on a management station and the second namespace is located on a target station.

3. A computer readable storage medium comprising instructions that, when executed by at least one processor, cause the at least one processor to:
present a Windows Management Instrumentation (WMI) command line;
receive at an executable file a command entered into a command line interface associated with the WMI command line;
switch from at least a first namespace to at least a second namespace in response to a global switch in the command, wherein the global switch permits a user to set an authentication level that the command line interface is configured to authenticate when Application Program Interface calls are made;
retrieve Windows Management Instrumentation (WMI) data through an Application Program Interface (API) call that is placed based on at least the second namespace specified by the global switch;
transform the retrieved WMI data into an extensible markup language (XML) form and returning the XML form to the command line interface;
apply an extensible style sheet language (XSL ) to the XML form to format the WMI data, wherein the XSL style sheet is based on an XSL file designated through format specifications; and
present the formatted WMI data through the command line interface;
wherein the command line comprises a WMI command line prompt and one or more global switch categories permitting a user to set one or more parameter commands, the one or more global switch categories comprising at least one of a namespace switch, a role switch, a node switch, an impersonation level switch, or an authentication level switch; and
wherein the command line enables a user to enter a command name to go into an interactive mode, wherein the interactive mode enables the user to enter multiple commands while sharing a same WMI connection, and to terminate the interactive mode with an exit command.

4. The computer readable storage medium of claim 3, wherein the WMI command line prompt enables a user to perform at least one of:
    enter one or more necessary commands; or
    enter an incomplete portion of a command and get help on completing the command.

5. The computer readable storage medium of claim 3, wherein the namespace switch permits a user to enter a namespace for a target namespace.

6. The computer readable storage medium of claim 3, wherein the impersonation level switch permits the user to set a level for the command line to impersonate a connection to a target station.

7. The computer readable storage medium of claim 3, wherein the authentication switch permits the user to set a level that the command line is to authenticate when a call is made against WMI data.

8. The computer readable storage medium of claim 3, the one or more global switch categories comprising at least one of:
    a language identifier switch;
    a privilege switch;
    a trace switch;
    a record switch;
    an interactive switch;
    a user switch;
    a password switch; or
    a help switch.

9. The computer readable storage medium of claim 8, wherein the language identifier switch permits the user to set the language identifier the command line should use.

10. The computer readable storage medium of claim 8, wherein the privilege switch permits the user to enable or disable program privileges using a property parameter.

11. The computer readable storage medium of claim 8, wherein the record switch permits the user to enter a file path where one or more commands may be logged.

12. The computer readable storage medium of claim 8, wherein the interactive switch permits a user to be in the interactive mode, entering multiple commands while sharing an WMI connection and terminating the interactive mode when an exit command is entered.

13. The computer readable storage medium of claim 3, the command line further comprising a command line category defined by an alias, wherein the alias is an instance of an alias class and the alias is unique in a context of a namespace in which the alias is defined.

14. The computer readable storage medium of claim 3, the command line further comprising a command line category defined by a standard command, wherein the standard command comprises at least one of CLASS, PATH, WHERE, or EXIT.

15. The computer readable storage medium of claim 14, wherein the WHERE command permits the user to query WMI data.

16. The computer readable storage medium of claim 14, the command line further comprising a verb clause category, wherein the verb entry comprises at least one of: CALL, SET, LIST, GET, or ASSOCIATE.

* * * * *